United States Patent [19]
Kaneko

[11] Patent Number: 5,882,162
[45] Date of Patent: Mar. 16, 1999

[54] DRIVING SCREW

[75] Inventor: Yoshihiro Kaneko, Tokyo, Japan

[73] Assignee: Max Co., Ltd., Tokyo, Japan

[21] Appl. No.: 980,314

[22] Filed: Nov. 28, 1997

[30] Foreign Application Priority Data

Nov. 29, 1996 [JP] Japan .................................. 8-319205
Mar. 6, 1997 [JP] Japan .................................. 9-069199

[51] Int. Cl.⁶ .................................................. F16B 35/04
[52] U.S. Cl. ........................... 411/411; 411/426; 411/386
[58] Field of Search .................................... 411/386, 387, 411/411, 412, 413, 424, 426

[56] References Cited

U.S. PATENT DOCUMENTS

| | | | |
|---|---|---|---|
| 1,980,093 | 11/1934 | Rosenberg | 411/412 |
| 2,382,019 | 8/1945 | Miller | 411/386 |
| 3,177,755 | 4/1965 | Kahn . | |
| 3,682,507 | 8/1972 | Waud | 411/413 |
| 3,752,030 | 8/1973 | Steurer | 411/411 |
| 3,942,405 | 3/1976 | Wagner | 411/386 |
| 4,179,976 | 12/1979 | Sygnator . | |
| 5,252,016 | 10/1993 | Schmid | 411/426 |
| 5,536,127 | 7/1996 | Pennig | 411/413 |

FOREIGN PATENT DOCUMENTS

| | | |
|---|---|---|
| 0 517 671 A1 | 6/1992 | European Pat. Off. . |
| 2853976 | 6/1980 | Germany .................. 411/413 |
| 93 17 008 U | 12/1994 | Germany . |
| 1229452 | 4/1971 | United Kingdom . |
| 2304391 | 3/1997 | United Kingdom . |

*Primary Examiner*—Flemming Saether
*Attorney, Agent, or Firm*—Morgan, Lewis, Bockius LLP

[57] ABSTRACT

A drive screw comprises: a head portion; a shank; and a helical thread portion extending along almost all the length of the shank, wherein an outside diameter of the drive screw including the thread portion being formed so as to be reduced from a portion close to the head portion in at least three stages.

5 Claims, 7 Drawing Sheets

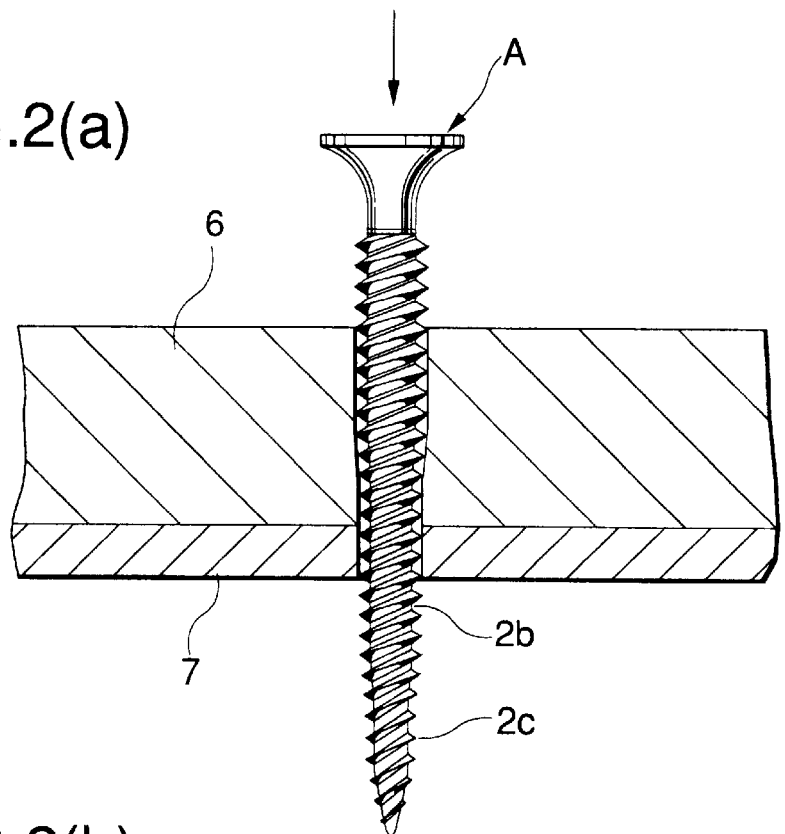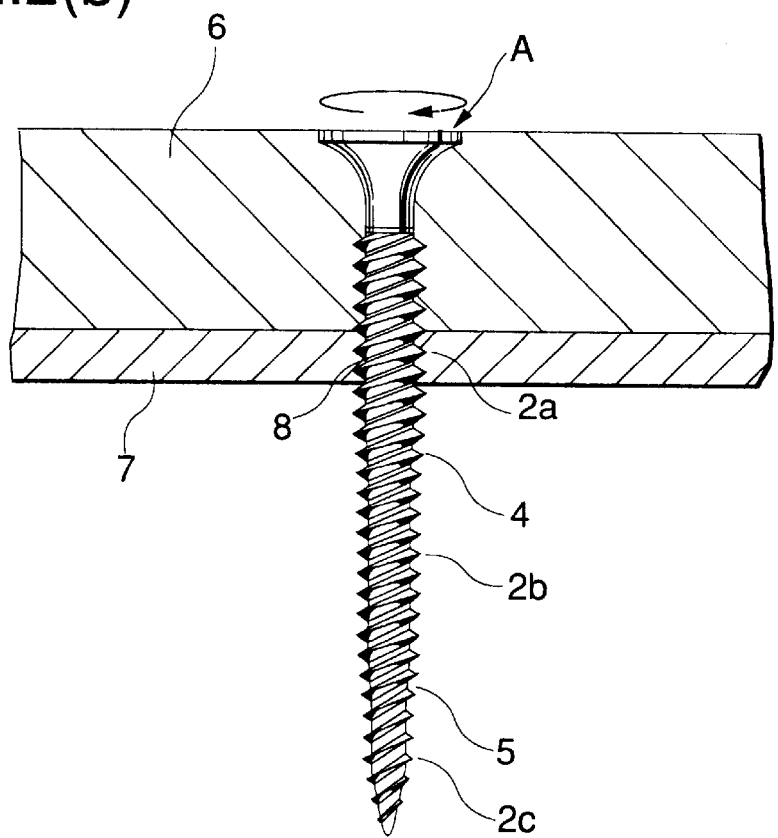

DRIVING SCREW

BACKGROUND OF THE INVENTION

The invention relates to a drive screw that fastens a member to be driven so as to be first driven onto and then screwed into such member to be driven.

Generally, drive screws are often used to fasten a gypsum board to a sheet steel. A drive screw includes a large diameter portion and a small diameter portion. First, when the drive screw has been driven, the small-diameter portion goes through a sheet steel to thereby allow the large-diameter portion to stay within a gypsum board, and then the large-diameter portion is screwed into the sheet steel in the screwing phase to thereby fasten the sheet steel and the gypsum board together.

There are cases where not only a single gypsum board but also two or more gypsum boards are fastened to a sheet steel. Further, gypsum boards to be used come in large and small thicknesses. It goes without saying that a drive screw for fastening two gypsum boards or a thick gypsum board is longer than a drive screw for fastening a single gypsum board or a thin gypsum board.

By the way, there are cases where fastening involves only a single gypsum board or two gypsum boards and fastening involves a combination of a thin gypsum board and a thick gypsum board at a single construction site. In such cases, the cumbersome operation of selecting a drive screw so that the lengths of the drive screws match the thicknesses of the gypsum boards impairs operation efficiency. Therefore, a drive screw that can overcome such inconvenience has been called for.

However, the shank of a conventional drive screw for a single gypsum board is too short to fasten two gypsum boards, so that defective fastening results. On the other hand, if a drive screw for two gypsum boards is used to fasten a single gypsum board, the large-diameter portion of such drive screw passes through as far as to a sheet steel, which thus imposes the problem that a predetermined fastening force cannot be provided. Therefore, in the case of the conventional drive screw, one must change the type of drive screw depending on the thickness and number of gypsum boards.

Similar problems have been addressed not only in the case of fastening a gypsum board to a sheet steel, but also in the case of fastening a plate member such as a sheet of plywood to a piece of timber.

Furthermore, the present applicant has proposed a drillig screw adapted for screwing operation to fix a gypsum board to a light gauge channel steel whose thickness is either 0.5 mm or 0.8 mm used as structural materials for the construction of houses (Japanese Patent Application No. Hei. 7-213780). The purpose of this drilling screw is to improve screwing efficiency by allowing gypsum board screwing operation to be performed using a drive type screwing machine whose operation time is faster than an electrically-driven screwing machine involving only rotating operation.

That is, when a gypsum board is screwed using a conventional drilling screw and a drive type screwing machine, addressed are inconvenience that the preceding drilling screw that has been fastened is slacken due to impact accompanied by the driving operation of the succeeding drilling screw, that the load stress of the drilling screw is reduced to a significant degree while embedded into the gypsum board, or the like. Therefore, the conventional drilling screw has not allowed the gypsum board screwing operation to be performed using the drive type screwing machine.

A drilling screw proposed by the present applicant has overcome the aforementioned problem. That is, the drilling screw is characterized as allowing the diameter thereof to be tapered from a large-diameter parallel thread portion having a trumpet head to a small-diameter parallel thread portion via a tapered thread portion and as giving a tapered bit portion at the point of the small-diameter parallel thread portion.

When the drilling screw is driven into a gypsum board that is overlapped on a light gauge channel steel using the driver of a drive type screwing machine, the tapered bit portion and the small-diameter parallel thread portion pass through the gypsum board and the light gauge channel steel. Then, the driver starts turning the drilling screw, causing the intricately designed thread ridges of the small-diameter parallel portion to develop a thrust in a direction in which the drilling screw passes through the light gauge channel steel, so that the tapered thread portion taps the through hole in the light gauge channel steel so as to enlarge such through hole. As a result, the parallel thread portion goes through the light gauge channel steel to thereby strongly fasten the drilling screw.

As a result of the small-diameter parallel thread portion and the tapered bit portion, the aforementioned drilling screw is advantageous in the following point compared with the conventional drilling screw having such a simple shape in which a parallel thread portion and a front end tapered thread portion are formed continuously to each other. That is, the aforementioned drilling screw can reduce the deformation and vibration of the steel sheet attributable to impact accompanied by the driving of the drilling screw into a light gauge channel steel, which in turn eliminates reduction in fastening force and load stress. As a result, the screwing operation using a drive type screwing machine which has not been able to be performed with the prior drilling screws can be implemented.

However, at the time of screwing the drilling screw into a side plate portion of the light gauge channel steel, the side plate portion that is weaker in shape holding strength than the bottom portion may, in some cases, be deformed due to impact applied by the drilling screw, or the gypsum board may, in some cases, float from the channel steel. In such cases, the drilling screw is not driven deep enough into the channel steel so that the small-diameter parallel thread portion may not, in some cases, go through the steel plate. As a result, the drilling screw does not develop thrust during the turning operation, so that the drilling screw idly turns while not being screwed in.

Therefore, addressed in the aforementioned cases also are technical problems to be overcome to fasten a gypsum board and a channel steel reliably.

SUMMARY OF THE INVENTION

An object of the invention is to overcome the aforementioned problem and to provide a drive screw that can fasten plate members such as gypsum boards with sufficient fastening force at all times independently of the total thickness of the plate members.

To achieve the object, the present invention provides a drive screw comprising: a head portion; a shank; and a helical thread portion extending along almost all the length of the shank, wherein an outside diameter of the drive screw including the thread portion being formed so as to be reduced from a portion close to the head portion in at least three stages.

It may be noted that the thread portion can be formed so as to be tapered in such a manner that a front end of the drive screw is reduced as a whole instead of reducing the thread portion in stages.

Furthermore, the present invention provide a drilling screw comprising: a first parallel thread portion having a trumpet head on one end thereof; a middle tapered thread portion extending from the first parallel thread portion, wherein the middle tapered thread portion is tapered; a small-diameter parallel thread portion extending from the middle tapered thread portion, wherein the small-diameter parallel thread portion has a smaller in diameter than the first parallel thread portion; and a end tapered thread portion extending from the small-diameter parallel thread portion, wherein the front tapered thread portion is tapered to the other end.

BRIEF DESCRIPTION OF THE DRAWINGS

FIGS. 2(a) and 2(b) are sectional views respectively showing a condition in which the drivescrew has been driven to fasten a single gypsum board, and a condition in which the drive screw has been screwed into the gypsum board;

DETAILED DESCRIPTION OF THE PREFERRED EMBODIMENT

Figure 1:
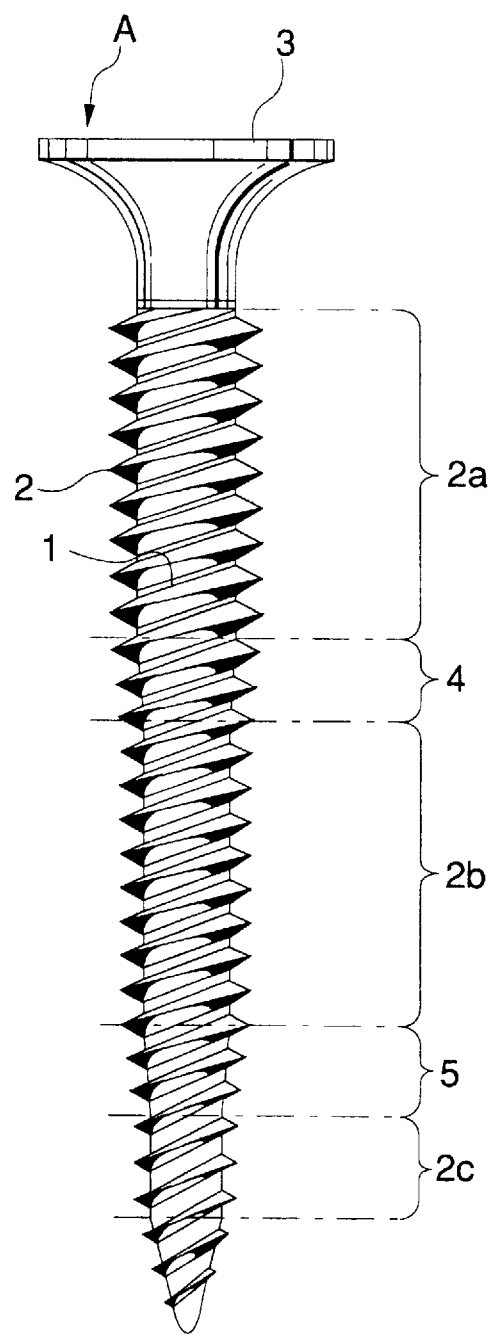
FIG. 1 shows a front view of a drive screw of an embodiment according to the invention.

In FIG. 1, a drive screw A of an embodiment of the present invention is shown. This drive screw A has a helical thread portion 2 formed along almost all the length of a shank 1. The outside diameter including the thread portion 2 is tapered from a portion close to a head 3 in three sequential stages: the upper stage, the middle stage, and the lower stage. Further, tapered portions 4, 5 are formed between the upper thread portion 2a and the middle thread portion 2b and between the middle thread portion 2b and the lower thread portion 2c so as to connect the respective thread portions 2a, 2b, 2c to each other.

Then, how the thus formed drive screw A is used will be described. First, in the case of screwing a single gypsum board 6 to a sheet steel 7 using a screw driving machine (not shown), the drive screw A stops when the middle thread portion 2b has passed through the sheet steel 7 as a result of the first-phase driving operation as shown in FIG. 2(a). Then, the drive screw A is turned by the second-phase screwing operation so that the upper thread portion 2a is screwed into the sheet steel 7 as shown in FIG. 2(b). Since the outside diameter of the upper thread portion 2a is larger than that of the middle thread portion 2b, the upper thread portion 2a is screwed into the sheet steel 7 strongly. As a result, a strong fastening force can be obtained. Further, since the tapered portions 4, 5 are formed between the upper thread portion 2a and the middle thread portion 2b and between the middle thread portion 2b and the lower thread portion 2c, resistance is reduced. As a result, the drive screw is allowed to go through these members 6, 7 during the first-phase driving operation and to be screwed into these members 6, 7 during the second-phase screwing operation smoothly. Hence, there is no likelihood that the through holes 8 formed in the gypsum board 6 and the sheet steel 7 will become excessively large nor be broken.

Figure 3A:
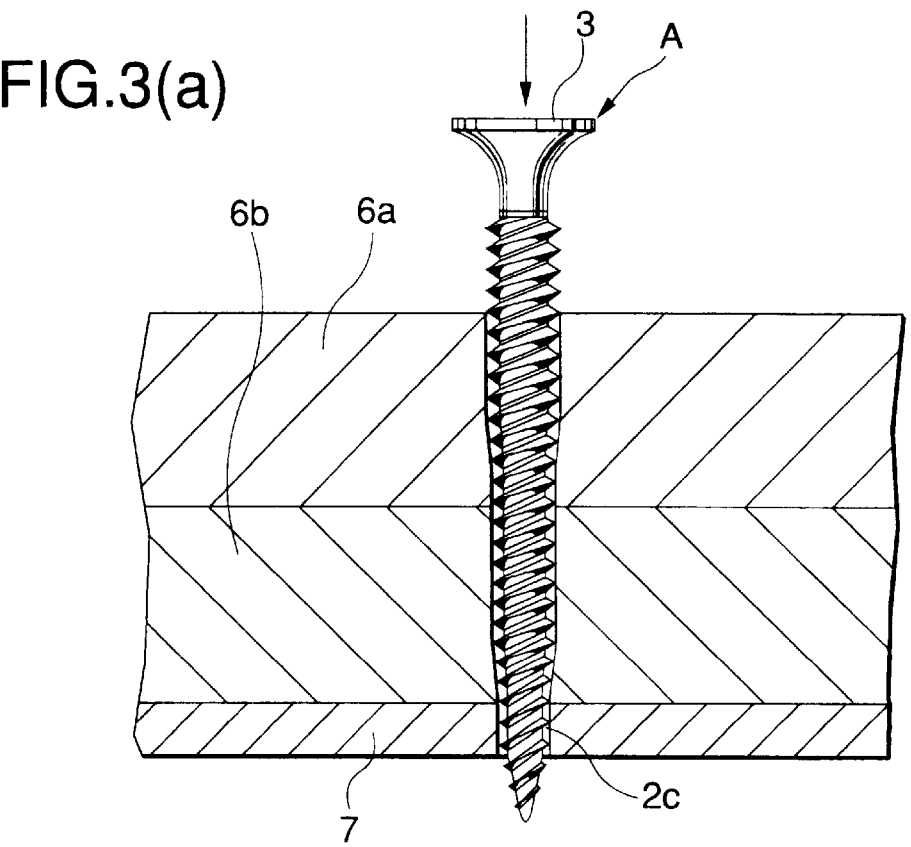
FIGS. 3(a) and 3(b) are sectional views respectively showing a condition in which the drive screw has been driven to fasten two gypsum boards, and a condition in which the drive screw has been screwed into the two gypsum boards.
Figure 3B:
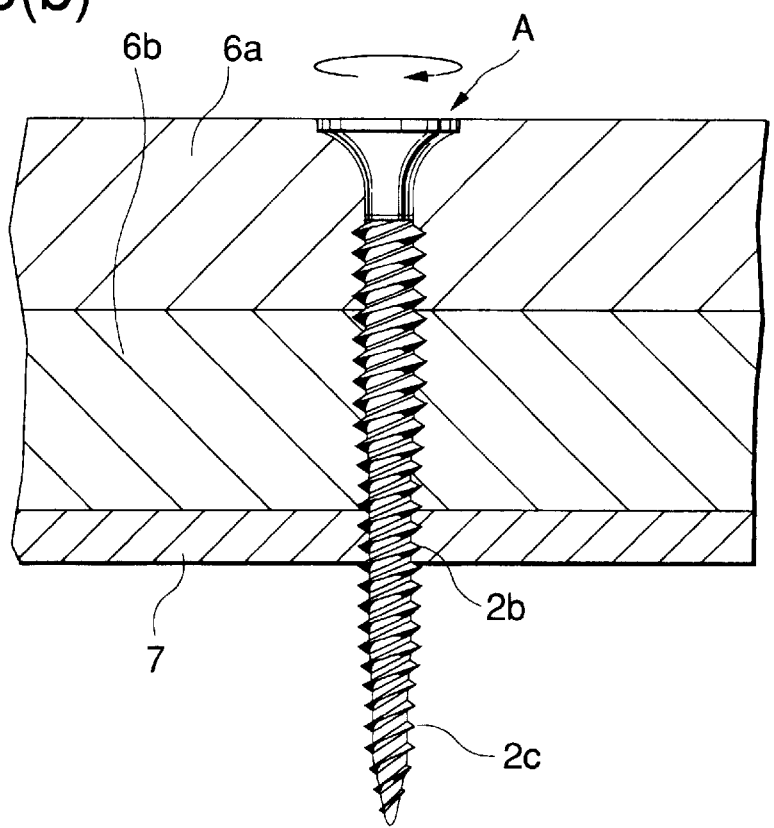

Then, in the case of screwing two gypsum boards 6a, 6b overlapped one upon another to the sheet steel 7, the driving depth (the distance from a surface of the outer gypsum board 6a to the head 3 of the drive screw A) given by the first-phase driving operation is, as shown in FIG. 3(a), substantially the same as that in the case of screwing a single gypsum board 6. Therefore, the drive screw A stops when the lower thread portion 2c has passed through the sheet steel 7. Then, the drive screw A is turned by the second-phase screwing operation as shown in FIG. 3(b) so that the middle thread portion 2b is screwed into the sheet steel 7. Since the outside diameter of the middle thread portion 2b is larger than that of the lower thread portion 2c, the middle thread portion 2b is screwed into the sheet steel 7 strongly. As a result, a strong fastening force is similarly obtained.

As described above, the drive screw A is formed so as to have three different outside diameters. Therefore, a single drive screw A can provide sufficient fastening forces corresponding to the gypsum boards 6, 6a, 6b of different thicknesses at all times. Hence, when the drive screw A is used, there is no need for having to go through the complicated operation of changing the type of the drive screw A in screwing a single gypsum board or two gypsum boards at a single construction site. Consequently, operation efficiency can be improved.

It may be noted that the number of outside diameters that are given in stages to the drive screw A is not limited to three; the drive screw A may have four or more different outside diameters. If one or two gypsum boards are to be fastened by such a drive screw, those portions having different outside diameters of the drive screw A stay within the gypsum boards themselves after the drive screw A has been screwed in. Therefore, the gypsum boards can be held more strongly.

Figure 4A:
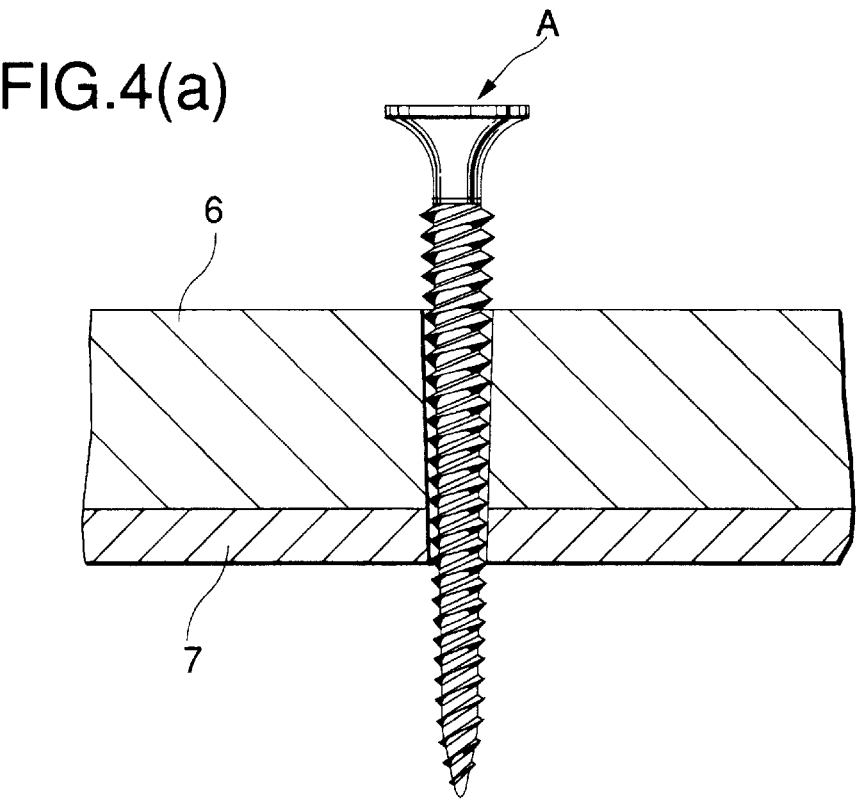
FIGS. 4(a) and 4(b) are diagrams illustrative of another embodiment of the present invention.
Figure 4B:
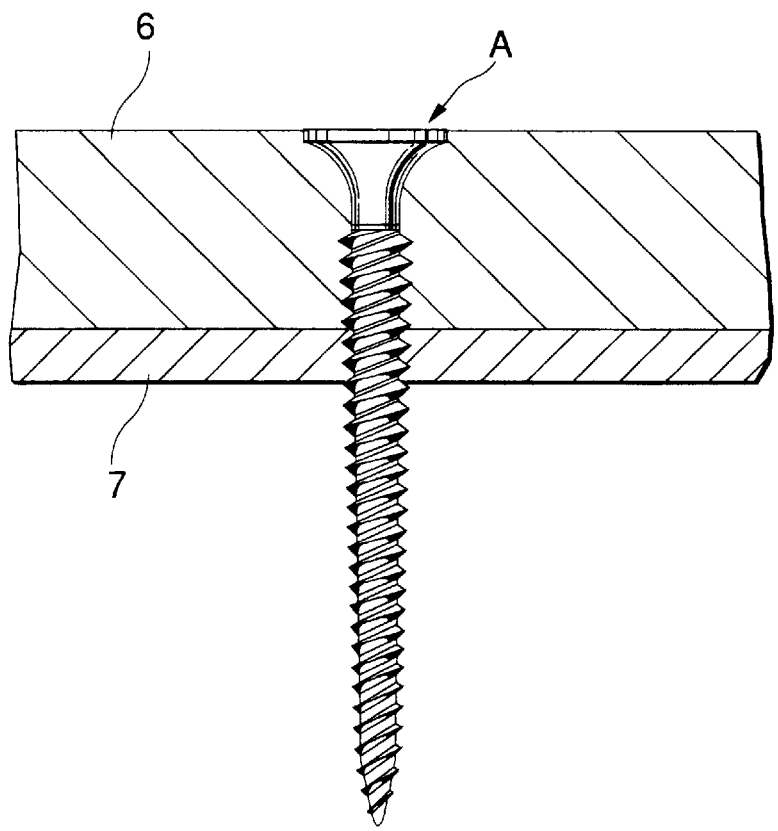

Further, the thread portion may be tapered so that the front end thereof becomes gradually thinner as a whole, instead of making the thread portions reduced in stages. In this case also, the hole formed in the sheet steel 7 becomes large as shown in FIGS. 4(a) and 4(b) when the drive screw A is further turned after having been driven into the sheet steel 7. Therefore, upon completion of the screwing operation, the drive screw A is screwed tightly into the sheet steel 7.

Further, while the example in which a gypsum board is fastened to a sheet steel by the drive screw has been described above, the invention is not limited to this example. For example, pieces of timber may be used in place of sheet steels, or sheets of plywood or boards may be used in place of gypsum boards. Their combinations may include: gypsum boards being fixed to pieces of timber, and sheets of plywood being fastened to sheet steels.

Figure 5A:
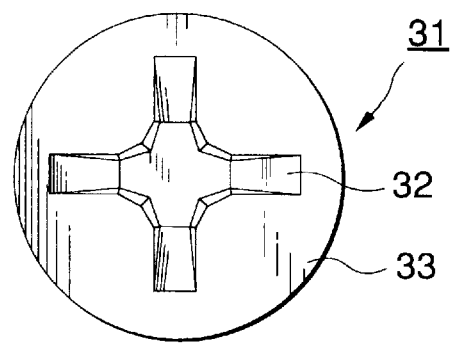
FIG. 5(a) is a plan view of a drilling screw of an embodiment of the present invention.
Figure 5B:
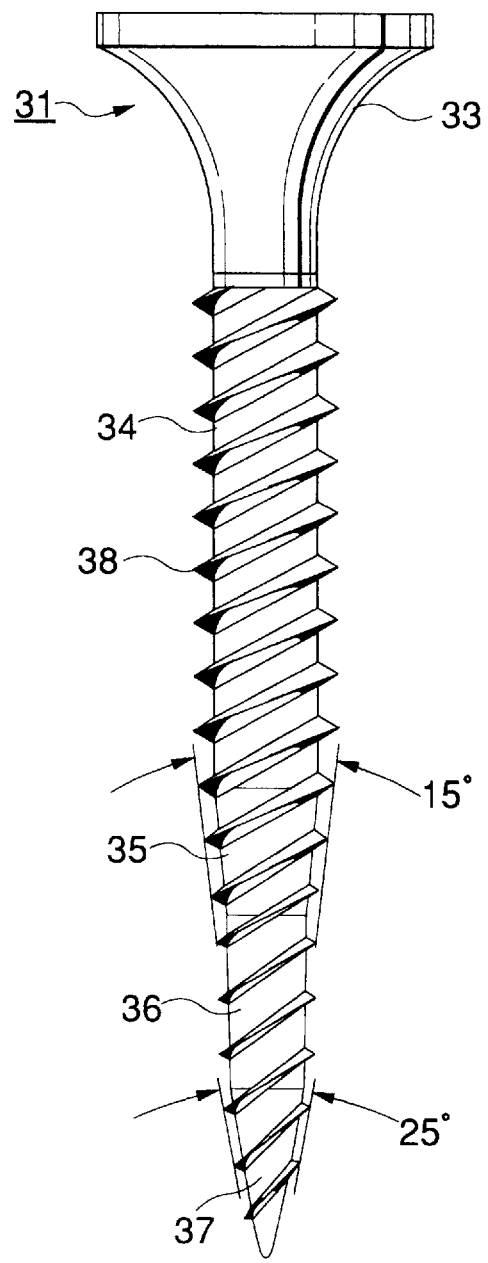
FIG. 5(b) is a front view of the same.

Another embodiment of the present invention will now be described in detail with reference to the drawings. As shown in FIGS. 5(a) and 5(b), a drilling screw 31 has a parallel thread portion 34 below a trumpet head 33 having a cross slot 32 formed therein. The parallel thread portion 34 has the diameter thereof reduced toward a small-diameter parallel thread portion 36 via a middle tapered thread portion 35, and has a front end tapered thread portion 37 formed via the small-diameter parallel thread portion 36.

The drilling screw 31 has the following dimensions; the total length of the screw 31 is 26.5 mm; the outside diameter of the trumpet head 33 is 8 mm; the outside diameter of the parallel thread portion 34 is 3.5 mm; and the outside diameter of the small-diameter parallel thread portion 36 is 2.5 mm. A double thread ridge 38 extending from the parallel thread portion 34 to the point of the front end tapered thread portion 37 has a tapering angle of 15 degrees in the middle tapered thread portion 35, and has a tapering angle of 25 degrees in the front end tapered thread portion 37. Further, the root diameter of the parallel thread portion 34 is 2.4 mm, and the root diameter of the small-diameter parallel thread portion 36 is 1.7 mm.

Figure 6:
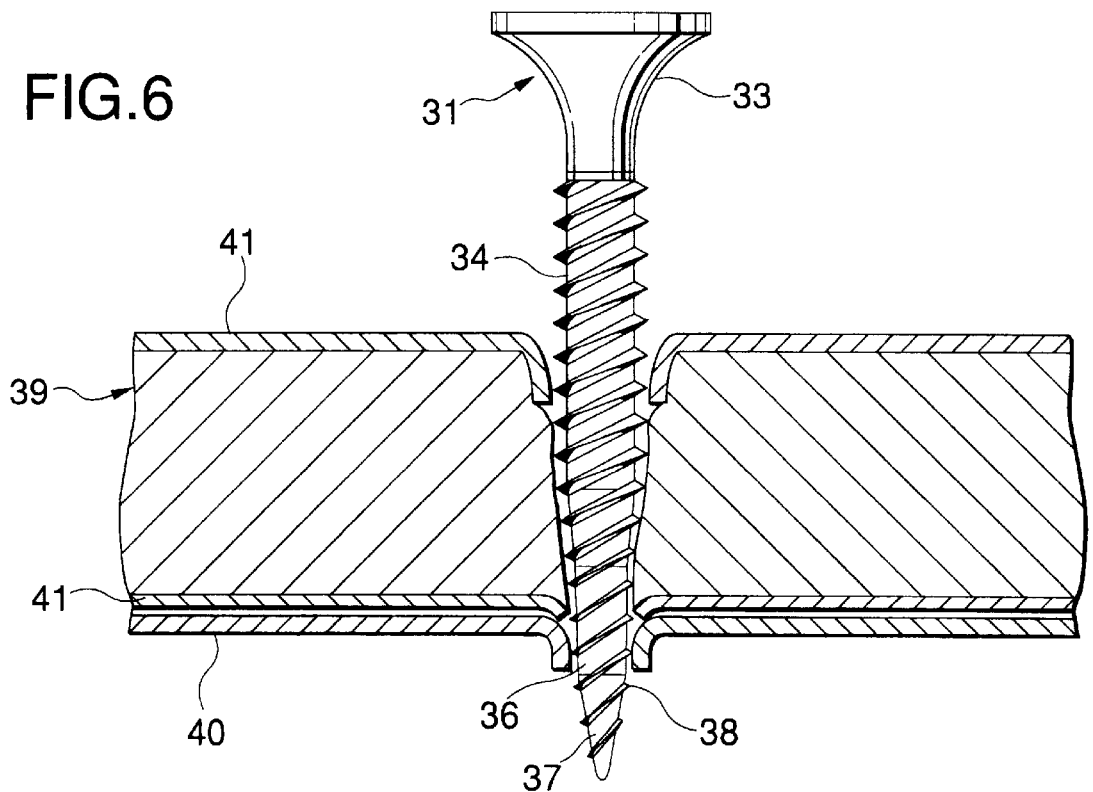
FIG. 6 is a sectional view showing how the drilling screw of FIGS. 5(a) and 5(b) is used with an example in which the drilling screw is being driven.

At the time of screwing a gypsum board (whose thickness is 9.5 mm or 12.5 mm) to a light gauge channel steel (whose thickness is 0.5 mm or 0.8 mm) using a drive type pneumatically-driven screwing machine and the drilling screw 31, the drilling screw 31 is driven into a gypsum board 39 lined with specified papers by the driver of the drive type pneumatically-driven screwing machine (not shown) as shown in FIG. 6. Thus, the drilling screw 31 causes the front end tapered thread portion 37 thereof to bore a hole in the light gauge channel steel 40, and usually stops with the small-diameter parallel thread portion 36 thereof having passed through the light gauge channel steel 40 as shown in FIG. 6. It may be noted that reference numeral 41 denotes the lining paper for the gypsum board.

Figure 7:
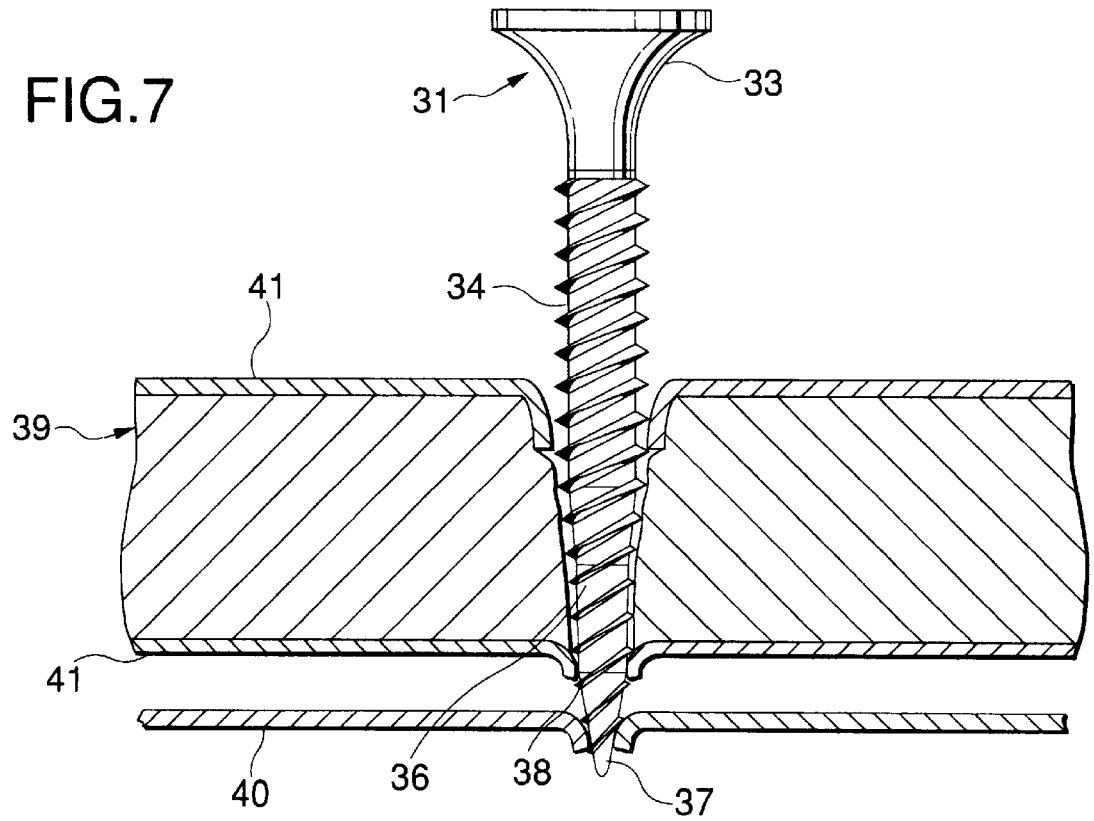
FIG. 7 is a sectional view showing how the drilling screw of FIGS. 5(a) and 5(b) is used with another example in which the drilling screw has been driven.

Further, the drilling screw 31 may, in some cases, have only the front end tapered thread portion 37 thereof having passed through the light gauge channel steel 40 as shown in FIG. 7 since the drilling screw 31 has not been driven deep enough due to the floating of the gypsum board, deformation of the light gauge channel steel, or the like.

Then, when the drilling screw 31 has started turning with the cross slot in the trumpet head 33 engaged with the driver of the screwing machine, a thrust is developed in the drilling screw 31 driving direction by the thread ridge 38 of the drilling screw 31 engaged with the light gauge channel steel 40 in either conditions shown in FIGS. 6 and 7, so that the drilling screw 31 taps the light gauge channel steel 40 while enlarging the through hole in the light gauge channel steel 40.

Figure 8:
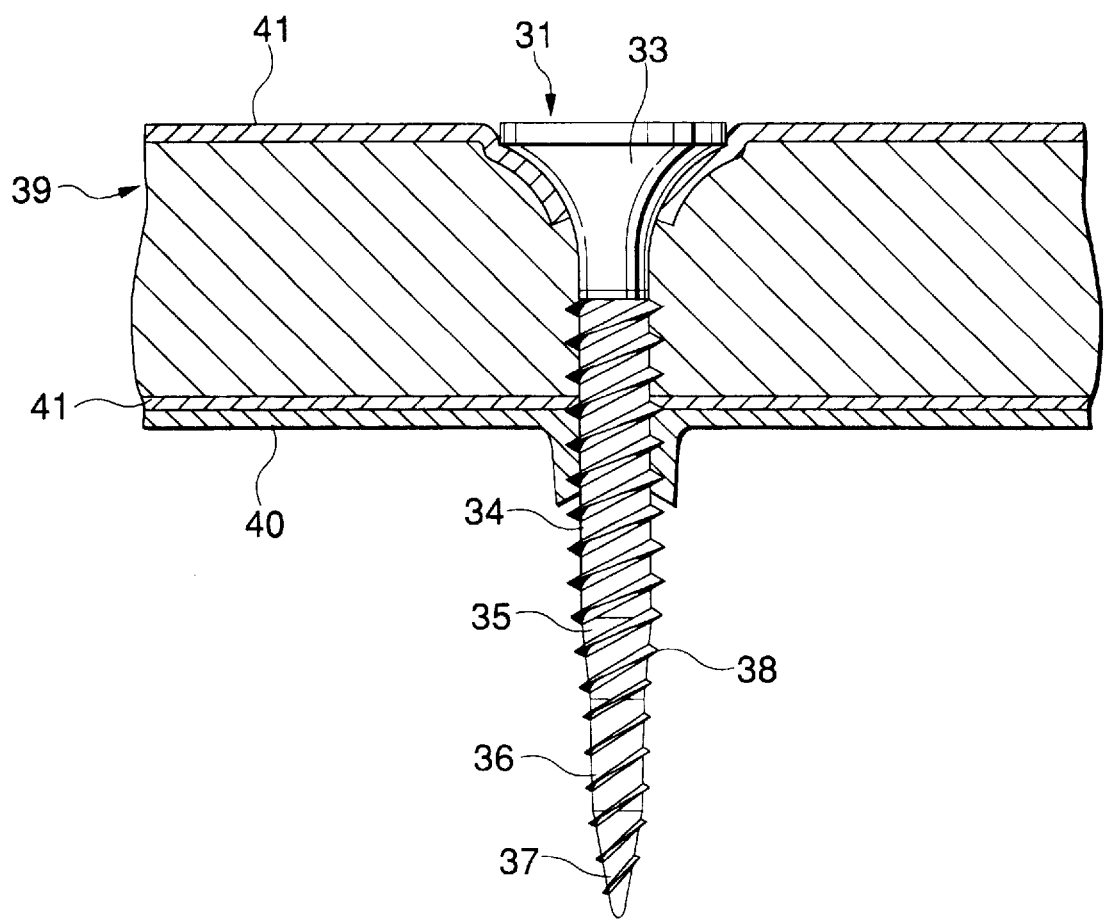
FIG. 8 is a sectional view showing a condition in which the drilling screw is fastened by turning from the condition shown in FIG. 6 or 7.

Then, the parallel thread portion 34 goes through the light gauge channel steel 40, and the trumpet head 33 enters into the gypsum board 39 so that resistance against thrust is increased, and as shown in FIG. 8, the drilling screw 31 stops turning when the height of the trumpet head 33 is substantially flush with a surface of the gypsum board 39.

As a result of an experiment in which a light gauge channel steel and a gypsum board are actually fastened together by a drive type screwing machine using the drilling screw 31, it has been verified that a relaxation torque requirement of 2.6 kgf·cm or more, which is equal to and greater than the result obtained by screwing using a screwdriver, is satisfied. Further, a reduction in the relaxation torque of the preceding drilling screw due to the driving vibrations caused by the succeeding drilling screw is 1.4 kgf·cm or less, which is equal to the data obtained by the drilling screw already proposed by the present applicant (Japanese Patent Application No. Hei. 7-213780). Further, neither the lining papers 41 of the gypsum board 39 break nor the screw floats similarly in the screwing operation with a screwdriver, and the light gauge channel steel 40 and the gypsum board 39 can be fastened even under the condition that the drilling screw 31 has not been driven deep enough due to the deformation of the light gauge channel steel 40, the floating of the gypsum board 39, or the like.

As described in the foregoing, the front end portion of the drilling screw of the invention has a small diameter, so that at the time of driving the drilling screw into a light gauge channel steel, the steel is less deformed and vibrated by the impact caused by driving. Therefore, not only the gypsum board can be fastened to the light gauge channel steel by the drive type screwing machine, but also the gypsum board and the light gauge channel steel can be fastened reliably even if the drilling screw has not been driven deep enough due to the floating of the gypsum board or the like. As a result, occurrence of defective fastening can be prevented, and constructing efficiency can be improved.

What is claimed is:

1. A screw comprising:
    a head portion;
    a tip portion;
    a cylindrical shank; and
    a helical threaded portion extending along almost all the length of the shank, the threaded portion comprising a first parallel thread portion located proximate said head portion, a second parallel thread portion, and a third parallel thread portion, wherein a first tapering thread portion separates said first and second parallel thread portions, and a second tapering thread portion separates said second and third parallel thread portions.

2. The screw according to claim 1, wherein said helical threaded portion extends substantially to an end of said tip portion.

3. The screw according to claim 1, wherein said head portion comprises a trumpet head.

4. The screw according to claim 1, wherein the diameter of said first parallel thread portion is greater than the diameter of said second parallel thread portion.

5. The screw according to claim 4, wherein the diameter of said second parallel thread portion is greater than the diameter of said third parallel thread portion.

* * * * *